(12) United States Patent
Chukka et al.

(10) Patent No.: US 10,176,579 B2
(45) Date of Patent: Jan. 8, 2019

(54) TISSUE OBJECT-BASED MACHINE LEARNING SYSTEM FOR AUTOMATED SCORING OF DIGITAL WHOLE SLIDES

(71) Applicant: Ventana Medical Systems, Inc., Tucson, AZ (US)

(72) Inventors: Srinivas Chukka, San Jose, CA (US); Sujit Siddheshwar Chivate, Dhayari (IN); Suhas Hanmantrao Patil, Katraj (IN); Bikash Sabata, Cupertino, CA (US); Olcay Sertel, Sunnyvale, CA (US); Anindya Sarkar, Milpitas, CA (US)

(73) Assignee: VENTANA MEDICAL SYSTEMS, INC., Tucson, AZ (US)

( * ) Notice: Subject to any disclaimer, the term of this patent is extended or adjusted under 35 U.S.C. 154(b) by 0 days.

(21) Appl. No.: 14/776,571

(22) PCT Filed: Mar. 12, 2014

(86) PCT No.: PCT/EP2014/054808
§ 371 (c)(1),
(2) Date: Sep. 14, 2015

(87) PCT Pub. No.: WO2014/140085
PCT Pub. Date: Sep. 18, 2014

(65) Prior Publication Data
US 2016/0042511 A1 Feb. 11, 2016

Related U.S. Application Data

(60) Provisional application No. 61/802,239, filed on Mar. 15, 2013.

(51) Int. Cl.
*G06T 7/00* (2017.01)
*G06K 9/00* (2006.01)
*G06T 7/11* (2017.01)

(52) U.S. Cl.
CPC .......... *G06T 7/0014* (2013.01); *G06K 9/0014* (2013.01); *G06K 9/00147* (2013.01);
(Continued)

(58) Field of Classification Search
None
See application file for complete search history.

(56) References Cited

U.S. PATENT DOCUMENTS 9,412,162 B2 * 8/2016 Molin ................. G06T 7/0012
2001/0050999 A1 * 12/2001 Bacus ................. G01N 15/1475
382/128

(Continued)

FOREIGN PATENT DOCUMENTS

CA  2899714 A1 * 9/2014 .......... G06T 7/0012
JP  2005-524090 A  8/2005
(Continued)

OTHER PUBLICATIONS

Dundar et al. "Computerized Classification of Intraductal Breast Lesions using Histopathological Images," IEEE Transactions on Biomedical Engineering, vol. 58, No. 7, Jul. 2011.*

(Continued)

*Primary Examiner* — Soo Shin
(74) *Attorney, Agent, or Firm* — Ventana Medical Systems, Inc.

(57) ABSTRACT

A facility includes systems and methods for providing a learning-based image analysis approach for the automated detection, classification, and counting of objects (e.g., cell nuclei) within digitized pathology tissue slides. The facility trains an object classifier using a plurality of reference sample slides. Subsequently, and in response to receiving a scanned image of a slide containing tissue data, the facility separates the whole slide into a background region and a tissue region using image segmentation techniques. The (Continued)

facility identifies dominant color regions within the tissue data and identifies seed points within those regions using, for example, a radial symmetry based approach. Based at least in part on those seed points, the facility generates a tessellation, each distinct area in the tessellation corresponding to a distinct detected object. These objects are then classified using the previously-trained classifier. The facility uses the classified objects to score slides.

21 Claims, 7 Drawing Sheets (52) U.S. Cl.
CPC .............. *G06T 7/0012* (2013.01); *G06T 7/11* (2017.01); *G06T 2207/20081* (2013.01); *G06T 2207/20156* (2013.01); *G06T 2207/30024* (2013.01); *G06T 2207/30068* (2013.01)

(56) References Cited

U.S. PATENT DOCUMENTS

| | | | |
|---|---|---|---|
| 2014/0178874 A1 | 6/2014 | Kuroda et al. | |
| 2014/0233826 A1* | 8/2014 | Agaian | A61B 5/7267 382/133 |
| 2014/0267671 A1* | 9/2014 | Kenny | G02B 21/26 348/79 |
| 2015/0279032 A1* | 10/2015 | Hall | G06T 11/203 382/128 |

FOREIGN PATENT DOCUMENTS

| | | |
|---|---|---|
| WO | 03094101 A1 | 11/2003 |
| WO | 2010123043 A1 | 10/2010 |
| WO | 2011049608 A2 | 4/2011 |
| WO | 2011126442 A2 | 10/2011 |

OTHER PUBLICATIONS

Aperio IHC Nuclear Image Analysis User's Guide, Aperio Technologies, Inc., Part No./Revision MAN-0027, Revision B, Jan. 2, 2007.*

Mosaliganti, "Microscopy image analysis algorithms for biological microstructure characterization," Dissertation, The Ohio State University, 2008.*

Kwak et al. "Multimodal microscopy for automated histologic analysis of prostate cancer," BMC Cancer, 2011, 11:62.*

Ruifrok, A.C. and Johnston, D.A., "Quantification of histochemical staining by color deconvolution." Anal. Quant. Cytol. Histol. vol. 23, No. 4, (2001), pp. 291-299.

Yang, Q., et al., "Perceptual organization of radial symmetries." Proc. of IEEE Int. Conf. on Computer Vision and Pattern Recognition, vol. 1 (2004), pp. 320-325.

Borgefors, G. "Distance transformations in digital images." Computer Vision, Graphics, and Image Processing, vol. 34, No. 3 (1986), pp. 344-371.

Beck, A.H., et al., "Systematic analysis of breast cancer morphology uncovers stromal features associated with survival." Science Translational Medicine vol. 3 issue 108 (2011), pp. 108ra113-108ra113.

Loy, G. and Zelinsky, A., "Fast radial symmetry for detecting points of interest." Pattern Analysis and Machine Intelligence, vol. 25, No. 8 (2003), pp. 959-973.

Schmitt, O. and Hasse, M., "Radial symmetries based decomposition of cell clusters in binary and gray level images." Pattern Recognition, vol. 41, (2007), pp. 1905-1923.

Veta, M., et al., "Detecting mitotic figures in breast cancer histopathology images." Proc. SPIE Medical Imaging, Digital Pathology, (2013), pp. 867607-1-867607-7.

Dundar, M.M., et al., "Computerized classification of intraductal breast lesions using histopathological images." IEEE Transactions on Biomedical Engineering, vol. 58 No. 7, (2011), pp. 1977-1984.

* cited by examiner

TISSUE OBJECT-BASED MACHINE LEARNING SYSTEM FOR AUTOMATED SCORING OF DIGITAL WHOLE SLIDES

CROSS REFERENCE TO RELATED APPLICATIONS

This application is a U.S. National Phase application of PCT/EP2014/054808, filed on Mar. 12, 2014, entitled "TISSUE OBJECT-BASED MACHINE LEARNING SYSTEM FOR AUTOMATED SCORING OF DIGITAL WHOLE SLIDES", which claims the benefit under 35 U.S.C. § 119(e) of and priority to U.S. Provisional Patent Application No. 61/802,239, filed Mar. 15, 2013, which is herein incorporated by reference in its entirety.

TECHNICAL FIELD

The technology disclosed herein relates to computer-based specimen analyzers.

BACKGROUND

Breast cancer is one of the most frequently diagnosed cancers today and the second leading cause of cancer related death among women. One indicator for predicting clinical behavior and prognosis of patients with breast cancer is the histological examination of biopsy/surgical samples based on a qualitative and semi-quantitative visual examination of sectioned tissue samples stained with immunohistochemical (IHC) markers, such as histological stains that provide the ability to differentiate microscopic structures of interest. Biomarkers can be used to characterize the tumor and identify the most appropriate treatment and medication that can improve the clinical outcome.

As opposed to membrane biomarkers, nuclear biomarkers interact with proteins in cell nuclei and dye cell nuclei. The color of a stained cell is indicative of the antigen (biomarker)-antibody binding for the cell. In a clinical reading, pathologists often report a score for the slide by visually reviewing and estimating the percentage of positively-stained (e.g., brown-colored) nuclear objects to the total number of positively-stained and negatively-stained (e.g., blue-colored) nuclear objects. In clinical and laboratory settings, a precise measurement requires manual counting of tumor cells by identifying positively-stained tumor cells, which can be extremely tedious. In practice, the slide score is often based on a "guestimation" by the pathologist. As a result, the manual score is not reproducible and is further subject to significant inter- and intra-reader variability. Moreover, for practical reasons, the interpretation of a whole slide is based only on a few representative fields of view (FOVs) identified by the pathologists, and the information in those fields of view only. Unfortunately, this "representative" analysis can lead to sampling bias.

OVERVIEW OF TECHNOLOGY

At least some embodiments of the disclosed technology are directed to imaging systems for automatically interpreting and scoring tissue specimen slides, for example, specimens stained with an immunohistochemical (IHC) assay. The system analyzes a region of an image or an entire image (e.g., a digital whole-slide image), based at least in part on information and characteristics associated with the whole slide and selects features for quantitative analysis. A whole slide image is considered an image of all or substantially all of the tissue containing regions (e.g., all regions of the slide excluding labels, markers, and blank areas) of a slide. The disclosed system identifies cellular structures (e.g., nuclear objects, nuclei seed) and cells in a region of a slide (e.g., a particular tissue region of the slide) or the whole slide, based at least in part on information pertaining to data associated with tissue containing regions of the slide. Furthermore, the disclosed system may count cells, compute various types of local and global features of these cells, identify the cell types, and perform quantitative analysis. The feature computation can use information from not only an annotated region of a slide but also information from the whole slide (e.g., tissue-containing regions of the slide analyzed at multiple magnifications). The system can automatically count and classify cells and score the image and/or entire slide based at least in part on selected fields of view and/or the whole slide based at least in part on information or data associated with the whole slide (i.e., all of the tissue containing regions of the slide). The score can be used for slide interpretation. For example, the system can accurately count nuclear objects to determine information about the tissue to assist with reliable and reproducible slide interpretation. In one embodiment, the system counts positively-stained nuclear objects and/or negatively-stained nuclear objects to score, for example, a biological specimen (e.g., tumor tissue). In some embodiments, an overlay image is produced to label features of interest in the image of a specimen from a subject. Scoring of the tissue may be performed to predict and/or generate a prognosis for the tissue sample.

In some embodiments, a pathologist can approve or reject a slide score. If the slide score is rejected, the automated score can be replaced with a manual score (e.g., a score based at least in part on visual inspection). The system can have a classifier that was trained based at least in part on a set of training or reference slides for each marker, for example biomarker. The set of training slides for a marker can represent all desired data variability. Different sets of slides can be used to train a classifier for each marker. Accordingly, for a single marker, a single classifier is obtained after training. Since there is variability between the image data obtained from different markers, a different classifier can be trained for each different biomarker so as to ensure better performance on unseen test data, where the biomarker type of the test data will be known. The trained classifier can be selected based at least in part on how best to handle training data variability, for example, in tissue type, staining protocol, and other features of interest, for slide interpretation. The system can analyze a specific region of an image based at least in part on information within that region, as well as information outside of that region.

In some embodiments, a multi-stage binary classifier can identify positive and negative nuclei. The positive nuclei can be distinguished from the negative nuclei, lymphocytes, and stroma. Additionally, the negative cells and lymphocytes can be distinguished from stroma. Lymphocytes are then distinguished from the negative nuclei. In further classification, the positive cells can be distinguished from background cells. For example, if the positive cells have brown stained nuclei, the background cells may be cytoplastmic blush that can be filtered out. Based at least in part on the number of positive/negative nuclei, a score (e.g., a whole-slide score) can be determined.

In some embodiments, a method for whole-slide interpretation includes identifying portions of a digitized whole slide image corresponding to tissue. Based at least in part on the color characteristics of the substrate (e.g., glass) on which the biological specimen (e.g., tissue) is placed, and the tissue, tissue regions of interest are identified. Seed points are detected for the identified tissue regions of interest, and tissue nuclei objects are extracted from the identified regions. For each of the extracted tissue objects, characteristics of the extracted object are identified, and a trained classifier can be used to classify the extracted object. The trained classifiers can be modified by a user, a physician, or the like. Different trained classifiers can be used to analyze different types of tissues and markers. A computer-readable storage medium can store data (e.g., classifiers, algorithms, etc.) and instructions that, if executed by a computing system having a processor, cause the computing system to perform such methods.

In further embodiments, a supervised learning system for classifying objects within digitized images of tissue data includes means for training a classifier based at least in part on ground truth slides, means for receiving a digitized image of tissue data associated with an input slide, and means for analyzing the digitized tissue data. The means for analyzing the digitized tissue data can comprise means for detecting potential nuclei seed points within the digitized tissue image and means for extracting objects from the digitized tissue image. In one embodiment, the system further includes means for classifying each of the extracted objects.

In some embodiments, a method used by a computing system can provide interpretation of digitized images of tissue slides, for example, IHC slides. The method includes receiving digitized images of tissue samples of reference training slides (e.g., ground truth or training slides). In some embodiments, a set of reference slides is used. For example, the reference slide images can be images of the same type of tissue as the tissue to be analyzed. The system learns about characteristics of the observed variability in the digitized image because of data variability in tissue, staining protocols, image scanning and artifacts sources based at least in part on the known information associated with the reference images. The system can receive at least one classification method and train a classifier using the digitized images of tissue samples. The classifier can be modified using additional reference slides, if needed or desired.

The system, in some embodiments, can receive a digitized image of data associated with an input slide with a sample from a subject. In some embodiments, the scoring of the slide occurs in, for example, one of two modes: a Field of View (FOV) mode and an automated mode. In the FOV mode, a user, such as a pathologist, outlines or "annotates" a number of regions (e.g., three or more regions) in a whole slide image and the analysis algorithm is performed with respect to the annotated regions. A final composite score is obtained based at least in part on the number of positive and negative tumor nuclei detected in all these annotated regions. In the automated mode, either an Area of Interest (AoI) detector finds or identifies a tissue region in the whole slide image or the tissue annotations are automatically generated by some other image analysis algorithm, such as image registration algorithm which maps annotations from the adjacent serial section to the IHC tissue slide. The tissue region is then segmented into tiles and classification and nuclei counting algorithms are performed with respect to each tile that contains tissue. Additionally, a composite score can be obtained based at least in part on the image tiles containing tissue. Though the underlying methodology for detecting, counting, and classifying cells in a given image are similar (the image may be a user annotated region or an automatically obtained tile in the whole slide image after AoI detection), there is at least one difference in the two workflows. The FoV mode relies on manual input in terms of FOV selection while the automated mode does not. The annotated FOV mode is further discussed with respect to FIG. 2 while the automated mode is further discussed with respect to FIG. 3. One or more regions within the identified tissue are identified based at least in part on dominant colors. For identified regions, seed points within the identified region are detected, and objects from the identified regions are extracted. Features of the extracted object(s) are computed such that the trained classifier classifies the extracted object(s) based at least in part on the computed features of the extracted object.

In some embodiments, a computer system can be programmed to automatically identify features in an image of a specimen based at least in part on one or more selection criteria, including criteria based at least in part on color characteristics, sample morphology (e.g., cell component morphology, cell morphology, tissue morphology, anatomical structure morphology, etc.), tissue characteristics (e.g., density, composition, or the like), spatial parameters (e.g., arrangement of tissue structures, relative positions between tissue structures, etc.), image characteristic parameters, or the like. If the features are nuclei, the selection criteria can include, without limitation, color characteristics, nuclei morphology (e.g., shape, dimensions, composition, etc.), spatial parameters (e.g., position of nuclei in cellular structure, relative position between nuclei, etc.), image characteristics, combinations thereof, or the like. After detecting candidate nuclei, algorithms can be used automatically to provide a score or information about the entire analyzed image. The selection criteria can be modified or determined based at least in part on reference images. For example, reference images of stained breast tissue can be used to determine selection criteria used to select nuclei of an image of breast tissue from a subject. In some embodiments, the user can delete any areas of interest on a slide-by-slide basis. For example, a user may visually determine that one or more areas of the image are unsuitable for scoring.

In some embodiments, the facility provides a method for whole slide interpretation of digitized images of tissue data. The method includes receiving a plurality of digitized images of tissue samples. Each tissue sample corresponds to a ground truth slide and for each of the plurality of digitized images, at least one classification associated with the digitized image. The facility is further configured to train a tissue-object classifier using the received digitized images of tissue samples. Upon receiving a digitized image of data associated with a first slide, wherein the first slide is not a ground truth slide, the facility identifies 1) tissue within the digitized image of data associated with the first slide, 2) dominant colors within the identified tissue, and 3) regions within the identified tissue based at least in part on the identified dominant colors. For each of the identified regions, the facility detects seed points within the identified region and extracts objects from the identified regions. Moreover, for each of the extracted objects, the facility can identify characteristics of the extracted object, and using the trained classifier, classify the extracted objects based at least in part on the identified characteristics of the extracted objects.

DETAILED DESCRIPTION

A facility can comprise systems and methods for providing a learning-based image analysis approach for the automated detection, classification, and/or counting of objects within digitized pathology tissue slides. The disclosed techniques can take advantage of whole slide context, computed from the scanned whole slide images at different magnifications, and supervised machine learning principles to automate the slide interpretation process and assist in clinical diagnosis. The facility can classify positively-stained nuclear objects, negatively-stained nuclear objects, tissue (including non-cell tissue), or other features in order to, for example, assign a score to an area of interest of an image, a given field of view (FOV), and/or an entire slide or group of slides. The facility is configured to detect different types of cell nuclei in a FOV and classify each cell nuclei. To analyze a breast tissue sample, for example, the facility can classify cell nuclei as positively-stained nuclei or negatively-stained nuclei and can disregard other tissue (e.g., stromata, lymphocytes, etc.) to determine a score based at least in part on, for example, percent positive/negative, H-score, etc. In some embodiments, the facility may further identify extraneous artifacts or "junk" features.

The disclosed detection and classification process can be extended to digitized whole-slide images to generate a score for the whole slide (e.g., by counting nuclei without selecting regions of interest, based on information from the whole slide). Using the techniques disclosed herein, the facility can automatically adapt to various sources of variability, such as specimen type, preparation, size, stain color, object size (e.g., nuclei sizes), shape variation, and so on. The disclosed techniques are capable of performing in the context of touching or overlapping objects, variations in stain intensity, variations in background, variations in the shape, color, and size of objects, and other variables.

In some embodiments, the facility initially trains an object classifier, such as a linear binary classifier in a multi-stage framework, using a plurality of "ground truth" sample slides or training images. Each ground truth slide can include, for example, annotated FOVs, each annotated FOV identifying the position and location of objects and various characteristics of those objects, such as color characteristics, shape and size characteristics, object descriptor characteristics, cytoplasmic characteristics, inter-object and density characteristics, and so on. In a hospital or laboratory setting, a pathologist can annotate the ground truth slides and train the object classifier using the ground truth slides. Alternatively, a manufacture of imaging equipment can train the object classifier, which is provided to clinics or laboratories for use with imaging equipment.

For each object in the ground truth slides, the ground truth data can identify the type of object (e.g., a positively-stained nuclear object, a negatively-stained nuclear object, stroma, or a lymphocyte). Using the ground truth slides and the associated characteristics information, the facility generates a classifier model that can be used for future object classification. The facility may calculate or determine various characteristics of each object and/or use characteristic data provided by an expert, such as a pathologist, provides characteristic information. Different ground truth slides can be used to train object classifiers for different interpretations, such as interpretations for gene status in breast carcinomas, IHC interpretation, or the like.

The facility can receive a scanned and digitized image of pathology tissue slide data to be analyzed. The slide data may be magnified (e.g., 1×, 2×, 5×, 20×, 40×, and so on). The facility can separate the whole slide into a background region (e.g., a glass background region) and a tissue (foreground) region using color image segmentation techniques, such as HSV (hue, saturation, and value)-based image segmentation. This process allows the facility to distinguish between the tissue data (the data of interest) and the slide. In some embodiments, the facility performs this process at varying levels of magnification, starting with a low level of magnification (e.g., 1× or 2×) and using increasing levels of magnification (e.g., 4×, 6×, 10×) to refine the segmentation process and decrease the likelihood that faint tissue regions are missed. Using the digitized data corresponding to whole slide tissue region data (i.e., the computed foreground), the facility identifies dominant stain colors. A hematoxylin (blue stain) and DAB (diaminobenzidine: brown stain) based IHC staining technique, for example, may result in blue negatively-stained nuclear objects, blue stromata, blue lymphocytes, and brown positively-stained nuclear objects. Accordingly, with this type of staining the facility will identify blue and brown as dominant colors.

Next, the facility projects the digitized slide data onto the dominant color space, the dominant color space corresponding to the stain colors typically present on the slides. Using the example above, the digitized slide data is mapped to blue and brown color spaces to identify the pixels that are sufficiently brown and sufficiently blue (e.g., have an intensity in the brown or blue color space that exceeds a threshold). Different thresholds can be used for different types of stains of different types of tissues. Using thresholding techniques, the facility can establish thresholds for each dominant color and identifies the regions corresponding to each of the dominant colors using the dominant color-projection and the established thresholds. In this manner, data from the whole slide can be used to detect and identify the two dominant color regions, thereby providing a whole slide context for object detection and classification.

In some embodiments, the facility invokes a voting kernel process to identify objects or seed points, for example, nuclear objects or nuclear seed points, within the two dominant color regions. Seed points can be points that are assumed to lie inside an object and are the starting point for localizing objects (e.g., nuclear objects or other features of interest). In other words, seed identification can identify the approximate center point or other internal point for objects. As discussed in further detail below with reference to FIG. 4A, to identify seed objects, the facility can generate a grayscale representation of the digitized slide data and then computes gradient information from the grayscale representation. The facility then generates a vote response matrix by, for each pixel having a gradient magnitude that exceeds a pre-defined threshold, casting a vote to that pixels local neighborhood. The local neighborhood is determined based at least in part on the local gradient direction and a pre-determined distance or radius range. Subsequently, each local maximum within with the vote response matrix that exceeds a voting threshold can be identified as a seed location. In a parallel and independent step, for example, an adaptive thresholding technique can be applied to the tissue data to distinguish between darker objects (e.g., cell nuclei) and other objects, (e.g., stroma and slide background) and generate an object foreground mask. The object foreground mask and the seed locations are used in combination to generate a tessellated version of the foreground image, where each distinct connected area of pixels or cell in the tessellated version corresponds to a distinct detected object or "blob." Each "blob" is then classified using a classifier (e.g., a previously-trained classifier) to identify one or more of positively-stained nuclear objects, negatively-stained nuclear objects, stromata, and lymphocytes. Once classified, the detected nuclear objects can be used to score a slide or particular regions within a slide. Thus, the disclosed techniques take advantage of whole slide context and machine learning techniques to improve nuclear object detection and automated slide scoring.

Figure 1:
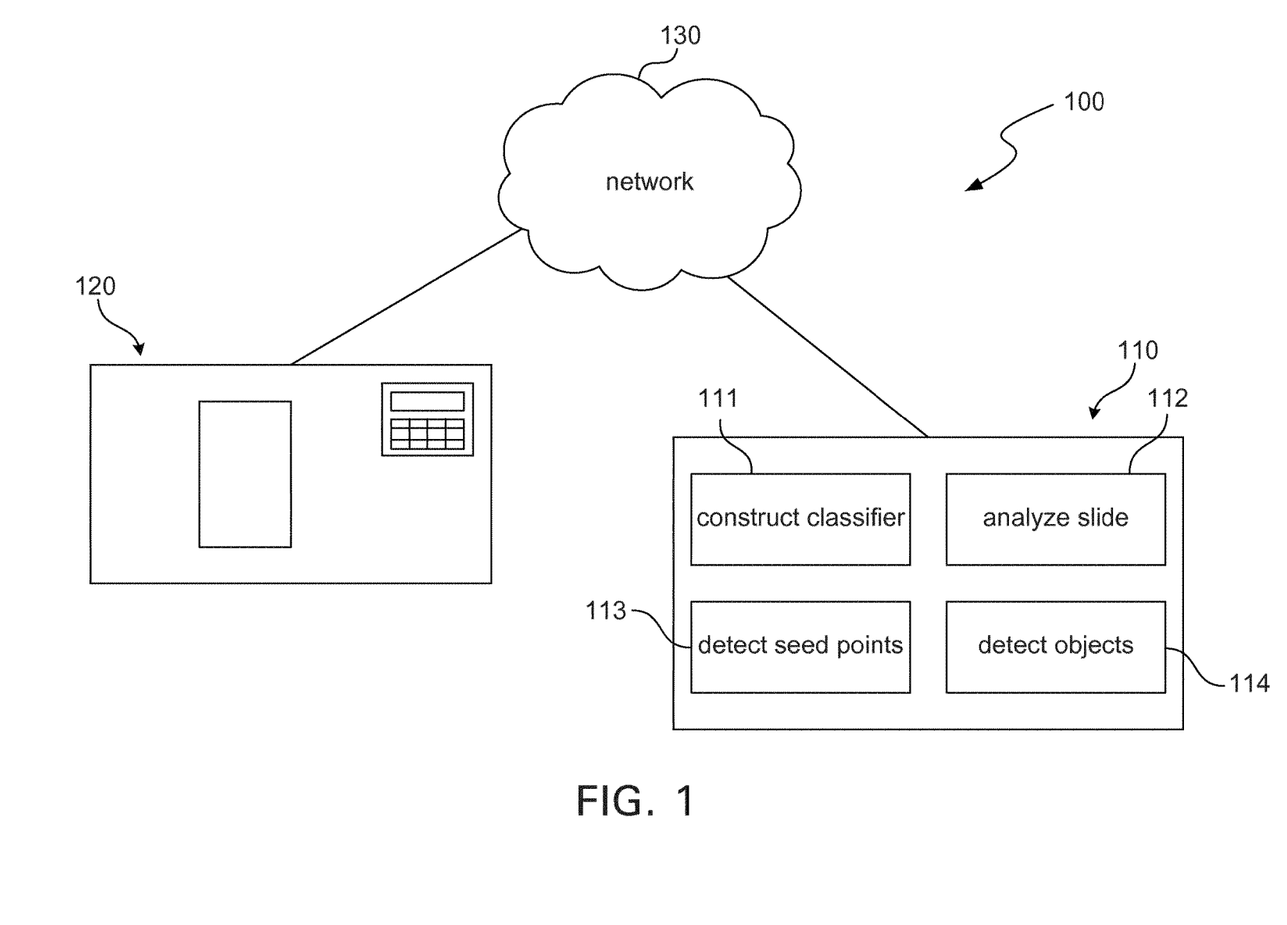
FIG. 1 illustrates a computer-based system and environment for analyzing specimens in accordance with an embodiment of the disclosed technology.

FIG. 1 illustrates a computer-based system and environment for analyzing tissue specimens in accordance with an embodiment of the disclosed technology. An analyzing system 100 includes an imaging apparatus 120 and a computer system 110. Specimen-bearing microscope slides can be loaded into the imaging apparatus 120. The imaging apparatus 120 can produce the images of the specimens. The images are sent to a computer system 110 either through a direct connection or via a network 130. The computer system 110 displays the images to a user. The computer system 110 can assist a user (e.g., a pathologist, a cellular scientist, a lab technician, or the like) by detecting and classifying objects and scoring the whole slide and/or regions (e.g., user-identified regions) of the slide.

The imaging apparatus 120 can include, without limitation, one or more image capture devices. Image capture devices can include, without limitation, a camera (e.g., an analog camera, a digital camera, etc.), optics (e.g., one or more lenses, sensor focus lens groups, microscope objectives, etc.), imaging sensors (e.g., a charge-coupled device (CCD), a complimentary metal-oxide semiconductor (CMOS) image sensor, or the like), photographic film, or the like. In digital embodiments, the image capture device can include a plurality of lenses that cooperate to prove on-the-fly focusing. A CCD sensor can capture a digital image of the specimen. One method of producing a digital image includes determining a scan area comprising a region of the microscope slide that includes at least a portion of the specimen. The scan area may be divided into a plurality of snapshots. An image can be produced by combining the snapshots. In some embodiments, the imaging apparatus 120 produces a high-resolution image of the entire specimen and/or an image of the entire mounting area of a slide.

The computer system 110 can include a desktop computer, a laptop computer, a tablet, or the like and can include digital electronic circuitry, firmware, hardware, memory, a computer storage medium, a computer program, a processor (including a programmed processor), or the like and can store digital images in binary form. The images can also be divided into a matrix of pixels. The pixels can include of a digital value of one or more bits, defined by the bit depth. The digital value may represent, for example, energy, brightness, color, intensity, sound, elevation, or a classified value derived through image processing. Non-limiting exemplary digital image formats include, but are not limited to, bit-mapped, joint pictures expert group (JPEG), tagged image file format (TIFF), and graphics interchange format (GIF), as well as other digital data formats.

The network 130 or a direct connection interconnects the imaging apparatus 120 and the computer system 110. The network 130 may include, without limitation, one or more gateways, routers, bridges, combinations thereof, or the like. The network 130 may include one or more servers and one or more websites that are accessible to users and can be used to send and receive information that the computer system 110 can utilize. A server may include, without limitation, one or more associated databases for storing information (e.g., digital images, algorithms, staining protocols, or the like). The network 130 can include, but is not limited to, data networks using the Transmission Control Protocol (TCP), User Datagram Protocol (UDP), Internet Protocol (IP) and other data protocols. The computer system 110 can perform the methods and techniques discussed herein. Components and features of the computer system 110 can be mixed and matched with other components and features of the disclosed technology.

The computing devices on which the disclosed techniques are implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the technology, e.g., a computer-readable medium that contains the instructions. In addition, the instructions, data structures, and message structures may be transmitted via a data transmission medium, such as a signal on a communications link and may be encrypted. Accordingly, computer-readable media include computer-readable storage media upon which data can be stored and computer-readable transmission media upon which data can be transmitted. The data can include, without limitation, object classifier routines, ground truth slide data (or other types of reference images), reference images, segmentation routines, scoring protocols, or the like. Various communications links may be used, such as the Internet, a local area network, a wide area network, a point-to-point dial-up connection, a cell phone network, and so on.

The disclosed techniques may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Many embodiments of the technology described herein may take the form of computer-executable instructions, including routines executed by a programmable computer. Those skilled in the relevant art will appreciate that aspects of the technology can be practiced on computer systems other than those shown and described herein. Embodiments of the technology may be implemented in and used with various operating environments that include personal computers, server computers, handheld or laptop devices, multiprocessor systems, microprocessor-based systems, programmable consumer electronics, digital cameras, network PCs, minicomputers, mainframe computers, computing environments that include any of the above systems or devices, and so on. Moreover, the technology can be embodied in a special-purpose computer or data processor that is specifically programmed, configured or constructed to perform one or more of the computer-executable instructions described herein. Accordingly, the terms "computer" or "system" as generally used herein refer to any data processor and can include Internet appliances and handheld devices (including palmtop computers, wearable computers, cellular or mobile phones, multi-processor systems, processor-based or programmable consumer electronics, network computers, mini computers and the like). Information handled by these computers can be presented at any suitable display medium, including a CRT display or LCD. A user can view images and scores on such displays.

The technology can also be practiced in distributed environments, where tasks or modules are performed by remote processing devices that are linked through a communications network. In a distributed computing environment, program modules or subroutines may be located in local and remote memory storage devices. Aspects of the technology described herein may be stored or distributed on computer-readable media, including magnetic or optically readable and removable computer disks, as well as distributed electronically over networks. Data structures, classifiers (e.g., trained classifiers), image data, reference images, and transmissions of data particular to aspects of the technology are also encompassed within the scope of the technology.

Figure 2:
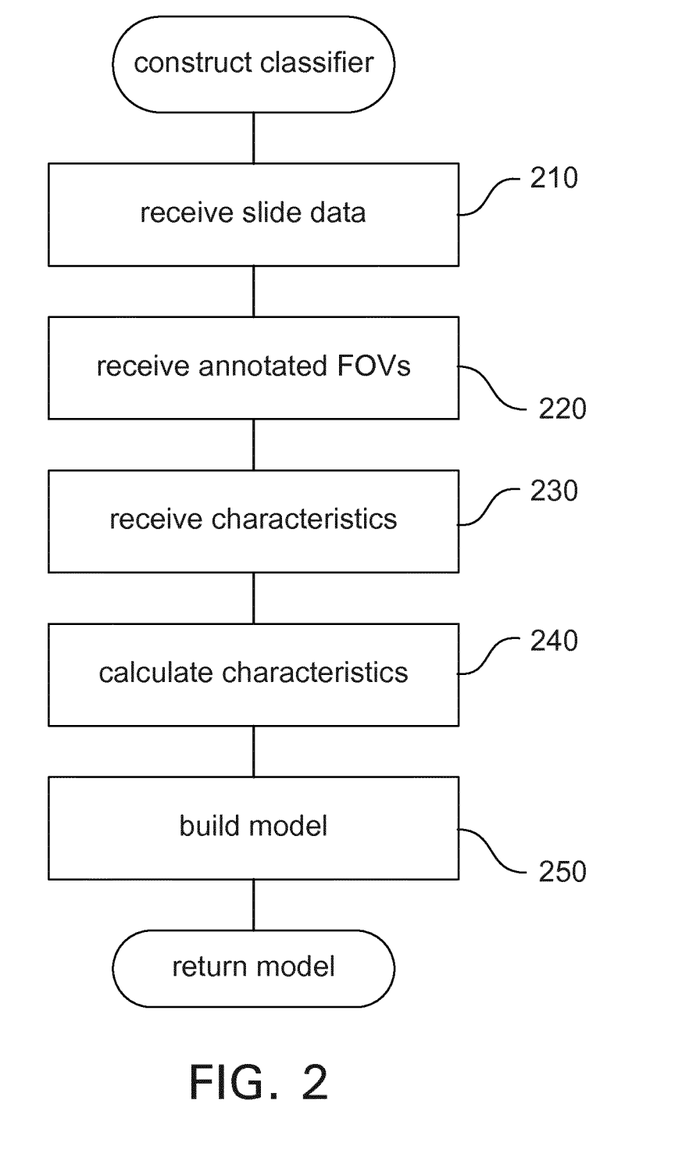
FIG. 2 is a block diagram illustrating the processing of a construct classifier component in accordance with an embodiment of the disclosed technology.

FIG. 2 is a block diagram illustrating the processing of a construct classifier component 111 in some embodiments. The system invokes the construct classifier component 111 to construct an object classifier model that is used to classify detected objects as, for example, positively-stained nuclear objects, negatively-stained nuclear objects, stromata, or lymphocytes. In block 210, the component receives slide data. The received slide data can correspond to "ground truth" slides that the facility uses to generate the model. In block 220, the component receives information about the slides, such as an indication of annotated FOVs for each slide. Each FOV can correspond to a portion of the slide that is interesting to the user, such as portions that contain one or more types of objects. Each object is identified by a particular location within a particular slide and an indication of whether it is a positively-stained nuclear object, a negatively-stained nuclear object, stroma, or a lymphocyte.

In block 230, the component receives characteristics for each object, computed, for example, from the annotated FOV and the whole slide context, such as color characteristics, shape and size characteristics (e.g., area, eccentricity, normalized nuclear size, size, elongation, morphology), object descriptor characteristics (e.g., voting strength, estimated radius, nucleus normalized average gradient strength, histogram of gradient strength and directions), cytoplasmic characteristics, inter-object and density characteristics, dominant color characteristics for each FOV or the slide as a whole, tissue/stromal/lymphatic region segmentation, and so on. The color characteristics can include, without limitation, average L*a*b value (L*a*b color space), Hematoxylin stain and DAB stain components, PC1 ratio (e.g., the projection of RGB (red, green, blue) onto the dominant IHC stain color in the whole slide), texture image features, DAB (diaminobenzidine) to hematoxylin intensity ratio, normalized color, standard deviation of the RGB values for the object, background mean and standard deviation of RGB intensities around the object. The inter-object and density characteristics can include, without limitation, packing density, distribution of the neighboring nuclear objects, number of nearest neighboring object centers, average distance to nearby object centers, MAD (median absolute deviation) distance to nearby nuclei center in all polar directions, or the like. The cytoplasmic characteristics can include, without limitation, multi-annular region features (intensity), differences from the nuclear intensity, multi-annular region color distances to the nucleus color, or the like. Furthermore, each object can be assigned a probability of belonging to a particular one of tissue, stromal, or lymphatic regions based at least in part on the region segmentation.

In block 240, the component computes characteristics of each object, such as those discussed above, to augment or enhance the user-provided characteristic information prior to generation of the classifier model. One skilled in the art will recognize that various characteristics of each object may be provided by a user as part of the ground truth information or may be computed by the facility once the user has identified the objects.

In block 250, the component generates a classifier framework, such as a multi-stage classifier framework, or other framework. The component then returns the generated classifier framework for storage and use by the facility to identify objects in digitized tissue data.

Figure 3:
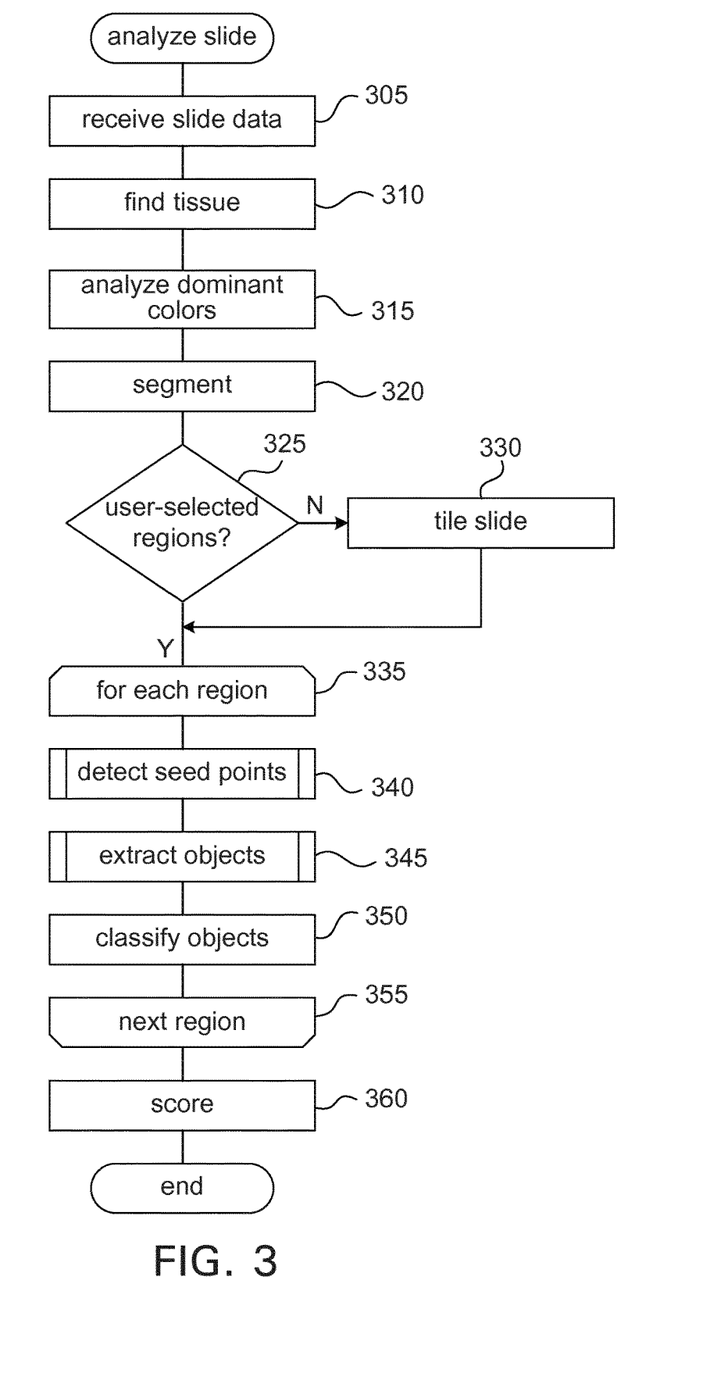
FIG. 3 is a flow diagram illustrating the processing of an analyze slide component in accordance with an embodiment of the disclosed technology.

FIG. 3 is a flow diagram illustrating the processing of an analyze slide component 112 in some embodiments. The system invokes the component to analyze and captured slide data to be analyzed. In block 305, the component receives slide data comprising digitized tissue data. The digitized tissue data may be generated, for example, by an iSCAN COREO™ by VENTANA MEDICAL SYSTEMS of Tucson, Ariz. or other suitable imaging equipment. In some embodiments, the digitized tissue data is from imaging apparatuses disclosed in International Patent Application No.: PCT/US2010/002772 (Patent Publication No.: WO/2011/049608) entitled IMAGING SYSTEM AND TECHNIQUES, which is incorporated by reference in its entirety. In other embodiments, the digitized tissue data is from a digital camera coupled to a microscope.

In block 310, the component performs an image segmentation technique to distinguish between the digitized tissue data and the slide in the image, the tissue corresponding to the foreground and the slide corresponding to the background. In some embodiments, the component computes the Area of Interest (AoI) in a whole slide image in order to detect all tissue regions in the AoI while limiting the amount of background non-tissue area that is analyzed. A wide range of image segmentation techniques (e.g., HSV color-based image segmentation, Lab image segmentation, mean-shift color image segmentation, region growing, level set methods, fast marching methods, etc.) can be used to determine, for example, boundaries of the tissue data and non-tissue or background data. Based at least in part on the segmentation, the component can also generate a tissue foreground mask that can be use to identify those portions of the digitized slide data that correspond to the tissue data. Alternatively, the component can generate a background mask used to identify those portions of the digitized slide date that do not correspond to the tissue data.

In block 315, the component performs a dominant color analysis of the foreground data (i.e., the tissue data). The dominant color analysis includes, without limitation, a) determining the dominant colors in the tissue data across the entirety of the digitized slide data, b) projecting the RGB image data onto the dominant color space, c) performing a thresholding technique (such as adaptive color thresholding, Otsu's method, balanced histogram thresholding, or other thresholding techniques), to identify those portions of the digitized slide data having an intensity value that exceeds a predetermined threshold in the dominant color space. For example, if the dominant colors are blue and brown, the component can identify those portions having intensity values in the blue or brown color space that exceed a threshold. The threshold may be established by a user or may be established by the component based at least in part on the range of colors or intensities within each color space. For example, the threshold may be defined as the median color or intensity, the mean color or intensity, the color or intensity that is some predetermined number of standard deviations away from (above or below) the mean color or intensity value, and so on. Other color analysis techniques can be used.

In block 320, the component 112 segments the digitized tissue data into glandular and stromal portions based at least in part on, for example, one or more of color, texture, a co-occurrence matrix, multi-scale Haar features, filter banks, and so on. Moreover, the component may perform the segmentation process at various scales, resolution levels, or magnification levels to reduce the probability of misidentifying different portions.

In decision block 325, if the user has identified or selected any FOVs of interest, then the component 112 continues at block 325, else the component continues at block 330. For example, the user may use a selection tool (e.g., mouse, joystick, icon such as a lasso tool or one or more key strokes or other mechanism) to select one or portions of the tissue displayed in the image as an FOV. These portions can be used in lieu of or in addition to automatically generated tiles of the slide.

In block 330, the component 112 can use a grid pattern to tile the portion of the slide corresponding to the tissue data. For example, the component may tile the whole slide tissue data, or a portion thereof, based at least in part on a fixed or set number of tiles (e.g., a 5×5 grid, a 10×10 grid, a 3×10 grid, etc.), based at least in part on a number of pixels for each tile (e.g., 60 pixels by 60 pixels, 150 pixels by 150 pixels, 300 pixels by 1000 pixels, etc.), dimensions for each tile (e.g., 1 μm×1 μm, 1 mm×1 mm, etc.), and so on. In some embodiments, the component may prompt the user to define the size/shape of each tile and/or the overall number of tiles along each dimension. In processing, a single tile image information from within the tiled region and also information from the whole slide context, which is extracted from different magnifications, and image information in the neighbor slides is used. Tile-based processing allows for the use of context-sensitive features that may not be present when using annotated FOV based workflow. For example, tile-based processing may enable the component to distinguish between negative tumor nuclei and lymphocytes, which can be important. Because Lymphocytes occur in clusters, lymphocyte context may or may not be adequately represented in a particular FOV. In contrast, when examining a particular tile, its neighboring tiles can be considered in order to provide additional context and a refined estimate of cell density. This additional context can help to discriminate between lymphocytes (generally densely packed) and negative tumor cells.

Another aspect where context based analysis is useful is that the whole slide image can be initially considered at a coarse resolution (e.g., 2×). Based on the initial tile-analysis, an approximate region segmentation process can be performed based at least in part on, for example, an identification of dense lymphocyte clusters. Accordingly, detected lymphocyte regions can be discarded while searching for, as an example, blue-stained tumor nuclei. Furthermore, reliable stromal region identification can assist in avoiding the counting of negative nuclei in stromal regions. At a coarse resolution, tile-analysis can find coarse texture-based features to perform a reliable detection of stromal regions. Thus, although the annotated FOV based workflow provides a relatively simple workflow, the whole slide based workflow presents many opportunities for intelligent image analysis. For example, use of context (e.g., surrounding tiles) provides extra information for classifying, for example, blue-stained cells (tumor nuclei can be discriminated from lymphocytes) based at least in part on their relative density and other features. As a result, context analysis can be used to perform a wide range of segmentation processes.

In blocks 335 to 355, the component loops through each region (i.e., the user-identified FOVs of interest or the tiles generated in block 330). In block 340, the component invokes a detect seed points component to identify seeds within the region that the component is currently processing. In block 345, the component invokes an extract objects component to identify the objects within the region that the component is currently processing. In block 350, the component uses a classifier, such as a classifier generated according to FIG. 2, to classify each of the extracted objects as a positively-stained nuclear object, a negatively-stained nuclear object, stroma, a lymphocyte, or an extraneous blob. In block 355, the component selects the next region, if any, and then loops back to block 335 for further processing. In block 360, the component generates and stores or displays a score for the slide or one or more regions within the slide by, for example, generating a positivity value (e.g., the ratio of positively-stained nuclear objects to the overall number of positively- and negatively-stained nuclear objects), calculating an H-score, or calculating another metric. Processing of the component is then completed. In some embodiments, the component may loop back to block 305 to continue receiving and analyzing slide data.

In some embodiments, the facility may pre-process a slide by tiling the slide and then detecting and classifying objects within the slide. In the event that a user wishes to perform an analysis of one or more particular regions or FOVs within a slide, the facility may identify all of the pre-processed tiles that intersect those one or more particular regions or FOVs and provide an analysis based at least in part on the intersection, pre-processed tiles rather than separately performing the identification and detection process for the one or more particular regions or FOVs. Moreover, the facility may perform the tiling and analysis at varying levels of granularity to increase accuracy. After the facility has detected objects, the facility may further display the objects and associated information, such as seed points or other computed characteristics. The user may use this displayed information to compare his or her own assessment of a slide or FOV to the automated assessment to gauge the accuracy of both the automated process and his or her own assessment. The disclosed techniques offer reliable and reproducible systems and methods for slide interpretation that can be used to augment the user's own assessment.

Figure 4A:
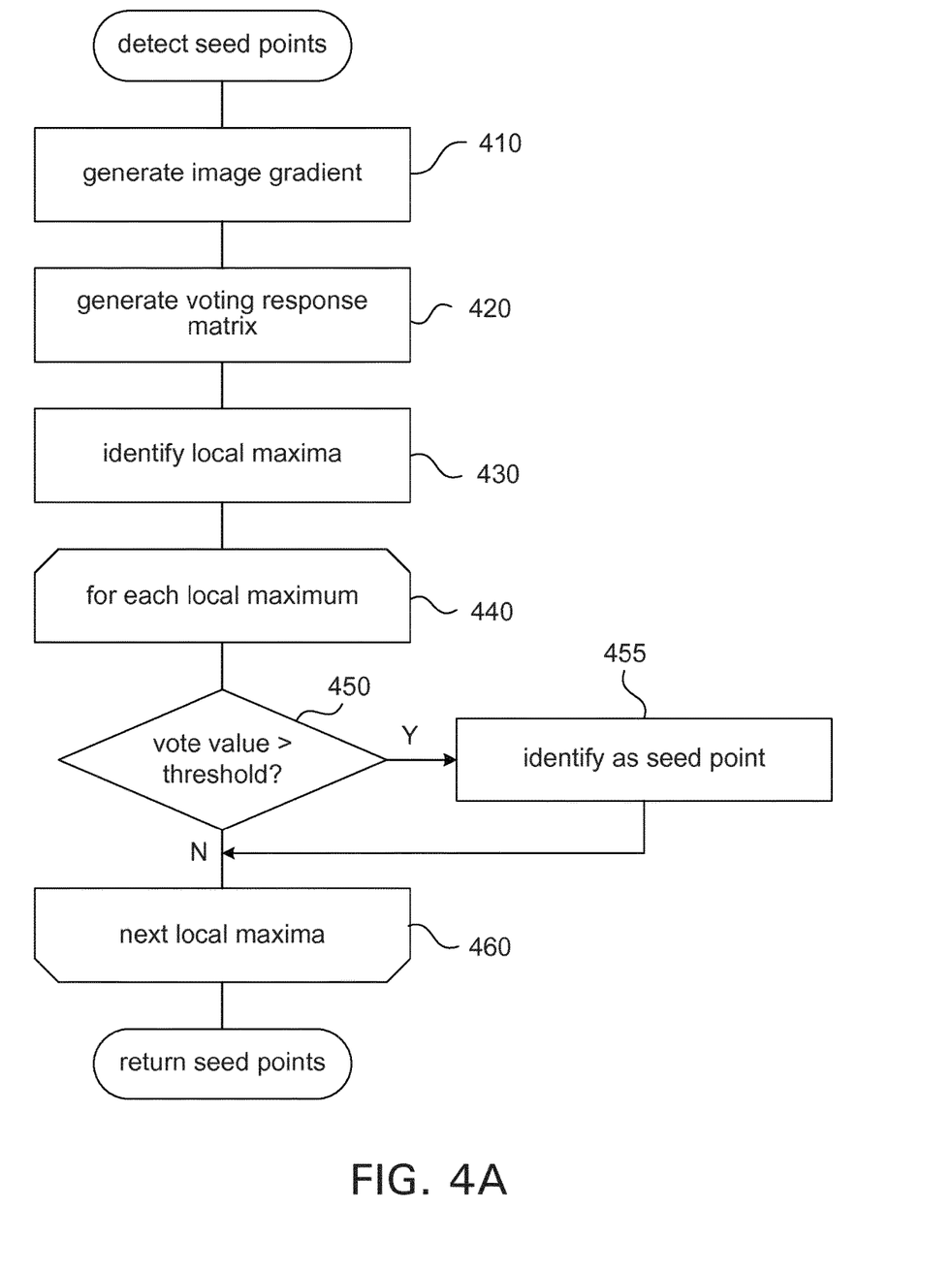
FIG. 4A is a block diagram illustrating the processing of a detect seed points component in accordance with an embodiment of the disclosed technology.
Figure 4B:
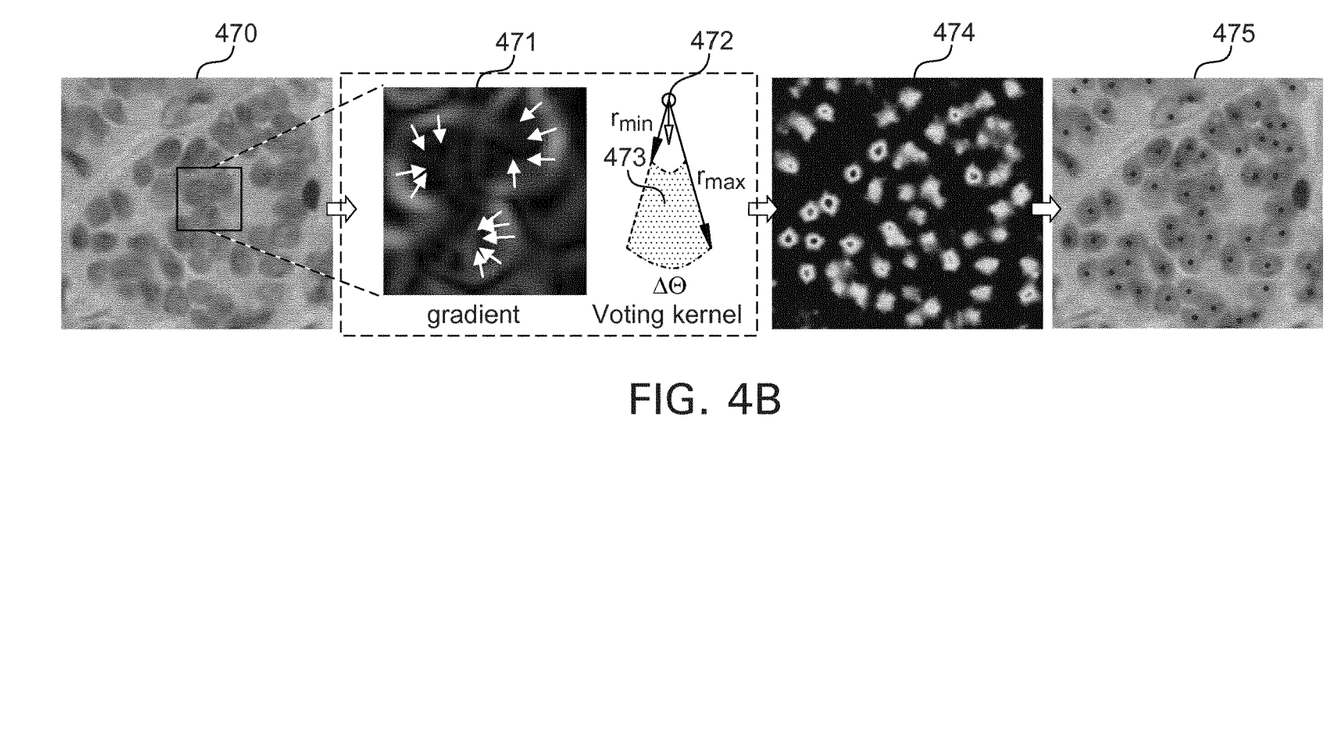
FIG. 4B illustrates image data and analysis at various stages in a voting kernel process performed on an image in accordance with an embodiment of the disclosed technology.
Figure 4C:
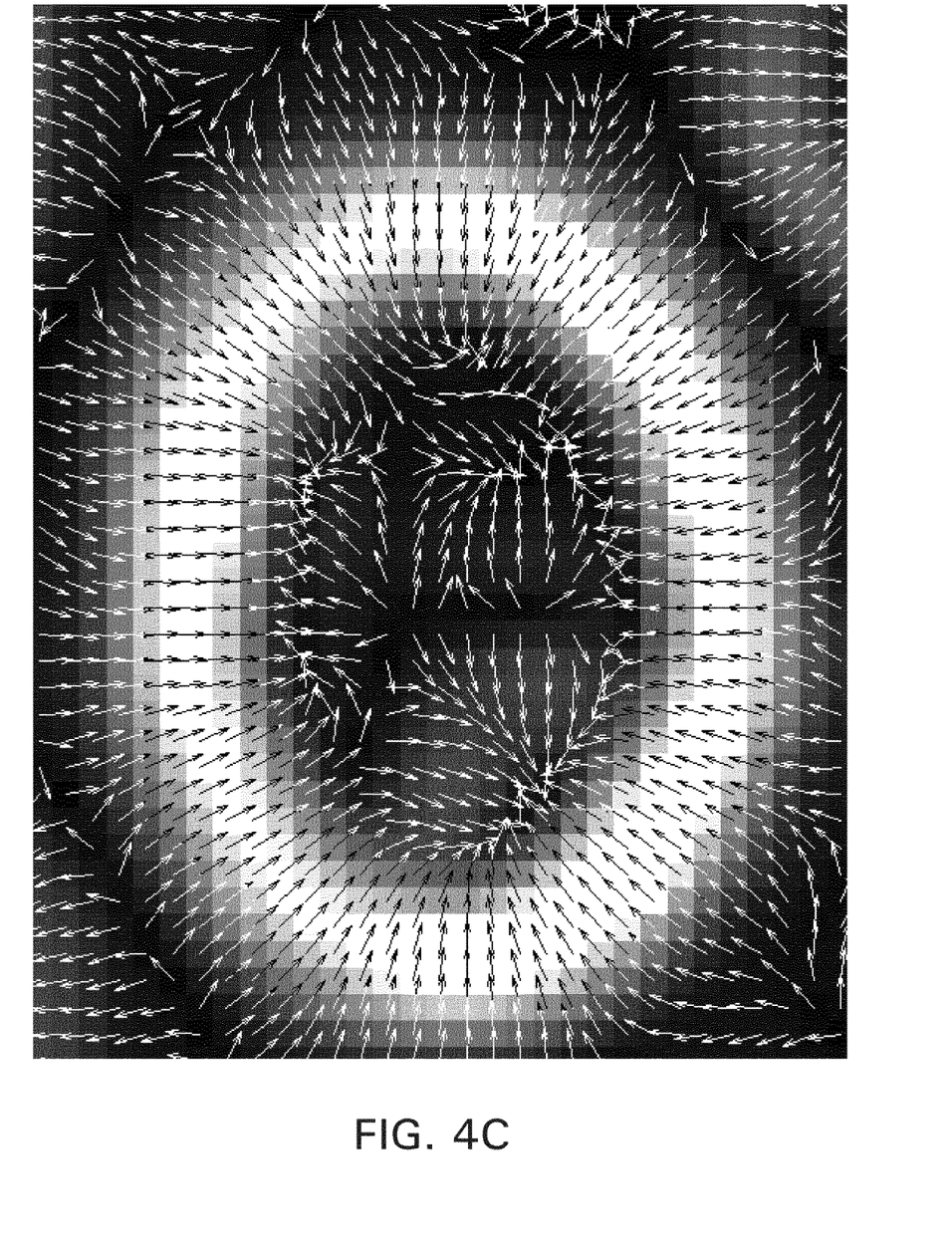
FIG. 4C is representative of an image gradient in accordance with an embodiment of the disclosed technology.

FIG. 4A is a block diagram illustrating processing of a detect seed points component 113 in some embodiments. The facility invokes the component to identify the location of seed points within a specified region of tissue data, each seed point corresponding to a potential object. Processing of the component is based at least in part on image information generated in steps 305-320 discussed above (e.g., tissue foreground mask, dominant color analysis, segmentation)

and thus is based, in part, on context generated from the whole slide. In exemplary embodiments of the present invention, the seed detection is done, for example, either on a single or two gray scale images computed from the input RGB image. In one embodiment, the gray scale image is computed from the input RGB image. In other embodiment, the two gray scale images are the Hemotoxylin and DAB channel gray scale images obtained by applying a color deconvolution algorithm (Ruifrok, A. C. & Johnston, D. A. (2001), "*Quantification of histochemical staining by color deconvolution*", *Anal. Quant. Cytol. Histol.* 23: 291-299) to the RGB input image. In either case, a similar method is used. In block 410, the component generates an image gradient from grayscale representations of the specified region. As is known to those skilled in the art, the image gradient represents, at each pixel, a multi-dimensional vector representative of a change in intensity in each dimension. An image gradient may be stored in the form of a matrix or other data structure. FIG. 4C is representative of an image gradient in some embodiments. Each of the arrows in FIG. 4C represents a change in intensity in the vertical and horizontal directions.

In block 420, the component generates a voting response matrix using a voting kernel process. FIG. 4B illustrates image data and analysis at various steps in a voting kernel process performed on image 470 in some embodiments. In some embodiments, the voting kernel process is based at least in part on a radial symmetry-based feature point detection technique and depends on a normalized gradient matrix for the tissue region being processed (see e.g., Yang, Q., Parvin, B.: Perceptual Organization of Radial Symmetries. Proc. of IEEE Int. Conf. on Computer Vision and Pattern Recognition (CVPR) 1 (2004), pp. 320-325, which is herein incorporated by reference in its entirety), where $\nabla p_i$ corresponds to the normalized gradient vector (each gradient value being divided by the maximum gradient value over all pixels) at a pixel location $p_i$. Image 471 represents an image gradient with gradient arrows drawn for each of a number of pixels. The voting kernel process further depends on $r_{min}$, equivalently specified in physical or pixel units, the minimum expected radius value for the voting kernel (e.g., 1, 2, 3), $r_{max}$, the maximum expected radius value for the voting kernel (e.g., 7, 8, 9) which is estimated based at least in part on a distance transform, θ (see, e.g., Borgefors, Gunilla. "Distance Transformations in Digital Images," *Computer Vision, Graphics, and Image Processing*, 34.3 (1986), pages 344-371, which is herein incorporated by reference in its entirety) applied to the foreground image, an angular extent of the voting kernel $$\left(\text{e.g., } \frac{\pi}{4}, \frac{\pi}{8} \text{ radians}\right),$$

and $\tau_{mag}$, the gradient magnitude threshold (e.g., 0.1), each of which can be defined by a user or the facility prior to performing the voting kernel process. Furthermore, the voting kernel process returns a voting matrix V, a radius matrix R and also maintains a count matrix C for storage, each of which has one entry for each pixel in the tissue region being analyzed and each entry is initialized to 0. The kernel process voting process proceeds by identifying those pixels $p_i$, where $\|\nabla p_i\|_2 \geq \tau_{mag}$ (i.e., those pixels whose image gradient magnitude is greater than or equal to the gradient magnitude threshold). For each of the identified pixels, the voting kernel process then identifies all pixels $p_k$ that satisfy both $$r_{min} \leq \|(p_{k,y}-p_{i,y}),(p_{k,x}-p_{i,x})\|_2 \leq r_{max}, \text{ and} \quad (a)$$

$$|\angle((p_{k,y}-p_{i,y}),(p_{k,x}-p_{i,x}))-\angle(\nabla p_i)| \leq \theta. \quad (b)$$

FIG. 4B illustrates a region 473 corresponding to pixels $p_k$ identified for pixel 472. For each identified pixel $p_k$, the voting kernel process adjusts V, R, and C as follows:

$$R(p_{k,x}, p_{k,y}) = R(p_{k,x}, p_{k,y}) + \|(p_{k,y} - p_{i,y}), (p_{k,x} - p_{i,x})\|_2$$

$$C(p_{k,x}, p_{k,y}) = C(p_{k,x}, p_{k,y}) + 1$$

$$V(p_{k,x}, p_{k,y}) = V(p_{k,x}, p_{k,y}) + \frac{1}{R(p_{k,x}, p_{k,y})}.$$

Image 474 represents a sample voting matrix V computed for image 470. In image 470, the red pixels correspond to the pixels with the greatest number of votes with decreasing numbers of votes shown as the image transitions to orange, yellow, green, blue, and dark blue. One skilled in the art will recognize that the voting kernel process may not generate an image such as image 474 but, rather, may generate the voting matrix as a matrix of numeric values. Once this process is completed for all identified $p_i$, the voting kernel process may adjust R as follows:

$$R(i,j) = R(i,j)/C(i,j) \text{ for all values of } R.$$

In block 430, the component identifies local maxima within the voting matrix V. In blocks 440-460, the component loops through each of the local maxima to determine whether the local maximum corresponds to a seed point. In decision block 450, if the local maximum's vote value (i.e., the value within the voting matrix corresponding to the local maximum) exceeds a vote threshold, then the component continues at block 455, else the component continues at block 460. The vote threshold may be predefined by a user or may be dynamically calculated by the component. For example, the component may calculate the vote threshold based at least in part on the mean value and some number of standard deviations (e.g., 0, 1, 2, 2.5, 3) of all of the values within V, the median vote value within V, and so on. In block 455, the component identifies the local maximum as a seed point and stores an indication of the seed point along with its location within the region and slide. Image 475 illustrates the identified seed points as red dots. In block 460, the component selects the next local maximum, if any, and then loops back to block 440 for further processing. Once all of the local maxima have been processed, the component returns the identified seed points for storage and use by the facility.

Figure 5:
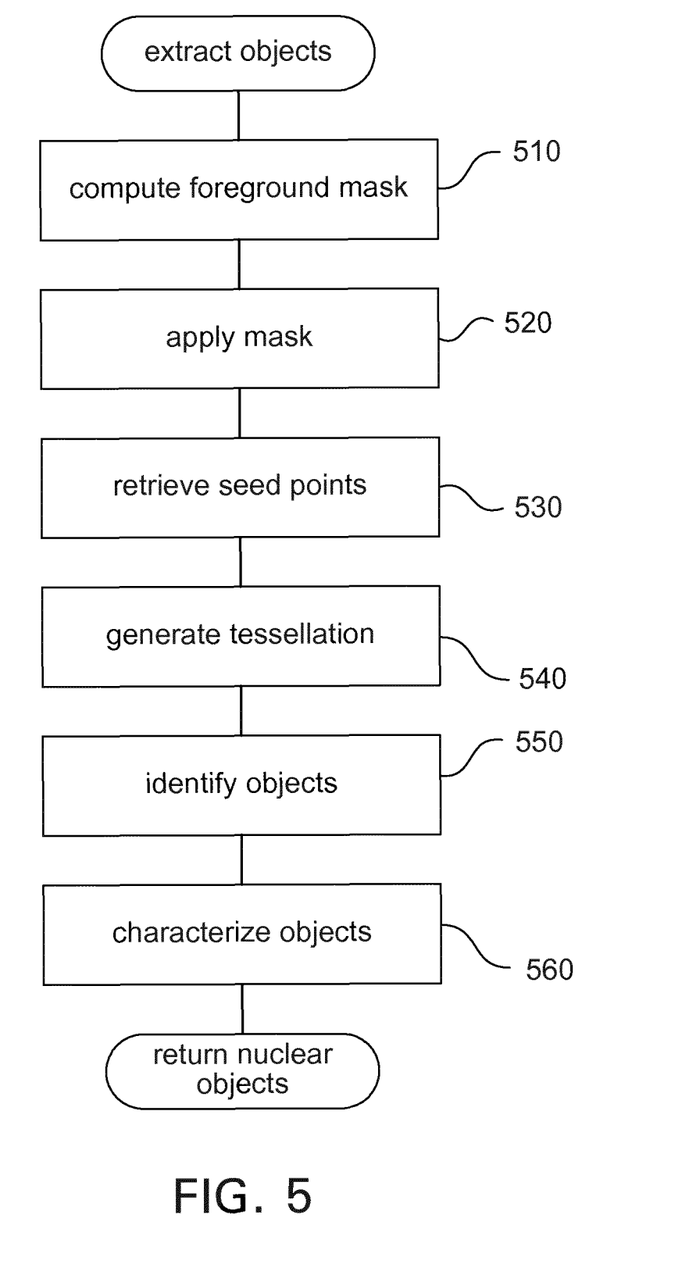
FIG. 5 is a flow diagram illustrating the processing of an extract objects component in accordance with an embodiment of the disclosed technology.

FIG. 5 is a flow diagram illustrating the processing of an extract objects component 114 in some embodiments. The facility invokes the component to identify boundaries around seed points that correspond to an object. Processing of the component is based at least in part on image information generated in steps 305-320 discussed above (e.g., tissue foreground mask, dominant color analysis, segmentation) and thus is based, in part, on context generated from the whole slide. In block 510, the component generates an object foreground mask by identifying those pixels that are darker than their local neighborhood intensity distribution and that exceed a global threshold. The object foreground mask may be generated, for example, by assigning a value of 1 for all pixels whose intensity value exceeds a mean intensity value for a local portion of the tissue (e.g., all pixels within the region currently being analyzed) and that also exceed a global threshold (e.g., 0.85). For pixels that do not meet these criteria, the component may assign another value, such as 0. The object foreground mask allows the facility to prune out weak and spurious objects that are unlikely to correspond to any object of interest (e.g., positively-stained nuclear objects, negatively-stained nuclear objects, stromata, and lymphocytes). In block 520, the component applies the generated mask to the digitized tissue data of the region currently being analyzed. In block 530, the component retrieves the seed points that correspond to the region currently being analyzed. In block 540, the component generates a tessellation of the foreground image (e.g., a Voronoi tessellation) data based at least in part on the retrieved seed points to identify those portions of the foreground image data that are associated with each of the seed points. In block 550, the component identifies, for each seed point, the portion of the foreground image that is associated with the seed point based at least in part on the tessellation. This portion or "blob" can be associated with the seed and can define the boundary of a detected object. In block 560, the component characterizes each of the identified objects based at least in part on location and any number of characteristics including, for example, color characteristics, shape and size characteristics, object descriptor characteristics, cytoplasmic characteristics, inter-object and density characteristics, or any of the above-mentioned characteristics. Each of these identified objects is then returned for storage and classification by a trained classifier as discussed above.

For storage and handling, the slides can be marked with a bar code, machine-readable code (e.g., a one- or multidimensional bar code or infoglyph, an RFID tag, a Bragg-diffraction grating, a magnetic stripe, or a nanobarcode), or some other type of electronically detectable identifier in order to, for example, match the scores to a particular slide. An analyzing system (e.g., the system 100 of FIG. 1) can store and recall scores from the computer-readable storage media and display those scores for a user. In addition or alternatively, a score and record of the analysis performed for the tissue in the slide can be transmitted over a computer communication link (e.g., the Internet) to a remote computer system for viewing, storage, or analysis. Such records can be combined with the analysis of other tissue samples for a variety of purposes, such as medical research. The system may also produce one or more reports concerning the tissue analysis for inclusion in a patient's records.

Tissue samples can be any liquid, semi-solid or solid substance (or material) in or on which a target can be present. The tissue can be a collection of interconnected cells that perform a similar function within an organism. A biological sample can be any solid or fluid sample obtained from, excreted by or secreted by any living organism, including without limitation, single celled organisms, such as bacteria, yeast, protozoans, and amebas among others, multicellular organisms (such as plants or animals, including samples from a healthy or apparently healthy human subject or a human patient affected by a condition or disease to be diagnosed or investigated, such as cancer). For example, a biological sample can be a biological fluid obtained from, for example, blood, plasma, serum, urine, bile, ascites, saliva, cerebrospinal fluid, aqueous or vitreous humor, or any bodily secretion, a transudate, an exudate (for example, fluid obtained from an abscess or any other site of infection or inflammation), or fluid obtained from a joint (for example, a normal joint or a joint affected by disease). A biological sample can also be a sample obtained from any organ or tissue (including a biopsy or autopsy specimen, such as a tumor biopsy) or can include a cell (whether a primary cell or cultured cell) or medium conditioned by any cell, tissue or organ.

The techniques disclosed herein offer a way to identify and distinguish between various types of objects, including positively-stained nuclear objects, negatively-stained nuclear objects, stromata, and lymphocytes. These techniques account for variations in data without requiring constant adjustment by a user to account for different inputs. One skilled in the art will recognize that the disclosed techniques can be extended to include other types of objects or to an entirely different set of objects that are visually-recognizable and distinguishable.

From the foregoing, it will be appreciated that specific embodiments of the technology have been described herein for purposes of illustration, but that various modifications may be made without deviating from the disclosure. For example, although brown and blue-staining are described above, one skilled in the art will recognize that staining techniques that result in other colors may also be used. The facility can include additional components or features, and/or different combinations of the components or features described herein. Additionally, while advantages associated with certain embodiments of the new technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. The following examples describe additional embodiments of the technology disclosed herein.

The invention claimed is:

1. A non-transitory computer-readable storage medium storing instructions that, if executed by a computing system having a processor, cause the computing system to perform operations comprising:
  receiving a digitized image associated with a slide;
  detecting seed points within the digitized image associated with the slide said detecting seed points within the slide comprising:
    generating an image gradient for a first identified region, and
    generating a voting response matrix for the identified region based at least on the generated image gradient, the voting response matrix comprising, for each pixel within the first identified region, a vote value;
  based at least on the detected seed points, extracting objects from the digitized image associated with the slide; and
  for each of the extracted objects,
    identifying characteristics of the extracted object, and
    using a classifier trained based at least on digitized images of tissue samples to classify the extracted object based at least on the identified characteristics of the extracted object.

2. The non-transitory computer-readable storage medium of claim 1, said detecting seed points within the slide further comprising:
  identifying local maxima within the generated voting response matrix.

3. The non-transitory computer-readable storage medium of claim 2, the operations further comprising:
  for each identified local maximum within the generated voting response matrix, only in response to determining that the local maximum exceeds a threshold value, identifying a corresponding pixel of the first identified region as a seed point.

4. The non-transitory computer-readable storage medium of claim 1, the operations further comprising:
identifying tissue within the received digitized image of data associated with the slide;
identifying dominant colors within the identified tissue;
for each identified dominant color,
associating pixels of identified tissue with the dominant color.

5. The non-transitory computer-readable storage medium of claim 1, wherein the classifier is a multi-stage classifier.

6. The non-transitory computer-readable storage medium of claim 5, wherein the multi-stage classifier classifies at least one extracted object as a positively-stained nuclear object or a negatively-stained nuclear object.

7. The non-transitory computer-readable storage medium of claim 1, further comprising:
training a tissue-object classifier using a plurality of reference tissue samples prior to using the classifier to classify the extracted objects, wherein the training comprises seed detection, nuclei object extraction, and features computation based at least on a whole slide image context.

8. A method comprising:
receiving a digitized image associated with a slide;
detecting seed points within the digitized image associated with the slide, said detecting seed points within the slide comprising:
generating an image gradient for a first identified region, and
generating a voting response matrix for the identified region based at least on the generated image gradient;
based at least on the detected seed points, extracting objects from the digitized image associated with the slide; and
for each of the extracted objects,
identifying characteristics of the extracted object, and
using a classifier trained based at least on digitized images of tissue samples to classify the extracted object based at least on the identified characteristics of the extracted object.

9. The method of claim 8, wherein said detecting seed points within the slide further comprises:
identifying local maxima within the generated voting response matrix.

10. The method of claim 9, further comprising:
for each identified local maximum within the generated voting response matrix,
only in response to determining that the local maximum exceeds a threshold value, identifying a corresponding pixel of the first identified region as a seed point.

11. The method of claim 8, further comprising:
identifying tissue within the received digitized image of data associated with the slide;
identifying dominant colors within the identified tissue;
for each identified dominant color,
associating pixels of identified tissue with the dominant color.

12. The method of claim 8, wherein the classifier is a multi-stage classifier.

13. The method of claim 12, wherein the multi-stage classifier is configured to classify at least one extracted object as a positively-stained nuclear object or a negatively-stained nuclear object.

14. The method of claim 8, further comprising:
training a tissue-object classifier using a plurality of reference tissue samples prior to using the classifier to classify the extracted objects, wherein the training comprises seed detection, nuclei object extraction, and features computation based at least on a whole slide image context.

15. A computing system comprising:
one or more processors;
at least one memory configured to store instructions which, when executed by the one or more processors, cause the one or more processors to perform operations comprising:
receiving a digitized image associated with a slide;
detecting seed points within the digitized image associated with the slide, said detecting seed points within the slide comprising:
generating an image gradient for a first identified region, and
generating a voting response matrix for the identified region based at least on the generated image gradient;
based at least on the detected seed points, extracting objects from the digitized image associated with the slide; and
for each of the extracted objects,
identifying characteristics of the extracted object, and
using a classifier trained based at least on digitized images of tissue samples to classify the extracted object based at least on the identified characteristics of the extracted object.

16. The computing system of claim 15, wherein said detecting seed points within the slide further comprises:
identifying local maxima within the generated voting response matrix.

17. The computing system of claim 16, wherein the operations further comprise:
for each identified local maximum within the generated voting response matrix,
only in response to determining that the local maximum exceeds a threshold value, identifying a corresponding pixel of the first identified region as a seed point.

18. The computing system of claim 15, wherein the operations further comprise:
identifying tissue within the received digitized image of data associated with the slide;
identifying dominant colors within the identified tissue; and
for each identified dominant color, associating pixels of identified tissue with the dominant color.

19. The computing system of claim 15, wherein the classifier is a multi-stage classifier.

20. The computing system of claim 19, wherein the multi-stage classifier is configured to classify at least one extracted object as a positively-stained nuclear object or a negatively-stained nuclear object.

21. The computing system of claim 15, wherein the operations further comprise:
training a tissue-object classifier using a plurality of reference tissue samples prior to using the classifier to classify the extracted objects, wherein the training comprises seed detection, nuclei object extraction, and features computation based at least on a whole slide image context.

* * * * *